United States Patent [19]

Rasshofer

[11] Patent Number: 4,931,595

[45] Date of Patent: Jun. 5, 1990

[54] CATALYTIC HYDROLYSIS PROCESS FOR POLYAMINES

[75] Inventor: Werner Rasshofer, Cologne, Fed. Rep. of Germany

[73] Assignee: Bayer Aktiengesellschaft, Leverkusen, Fed. Rep. of Germany

[21] Appl. No.: 389,384

[22] Filed: Aug. 2, 1989

Related U.S. Application Data

[63] Continuation-in-part of Ser. No. 239,143, Aug. 31, 1988, abandoned, which is a continuation of Ser. No. 908,535, Sep. 16, 1986, abandoned.

[30] Foreign Application Priority Data

Oct. 1, 1985 [DE] Fed. Rep. of Germany ....... 3534947

[51] Int. Cl.$^5$ .............................................. C07C 85/00
[52] U.S. Cl. ..................... 564/393; 564/61; 564/414; 564/468; 564/489; 564/511; 528/53; 528/57
[58] Field of Search ................. 564/61, 393, 414, 468, 564/489, 511; 528/53, 57

[56] References Cited

U.S. PATENT DOCUMENTS

| | | |
|---|---|---|
| 2,888,439 | 5/1959 | Simons . |
| 3,044,989 | 7/1962 | Shivers . |
| 3,385,829 | 5/1968 | Heydkamp et al. . |
| 3,536,668 | 10/1970 | Wieden et al. ........................ 260/75 |
| 3,625,871 | 12/1971 | Trumbel et al. . |
| 3,808,250 | 4/1974 | Blahak et al. . |
| 3,865,791 | 2/1975 | Brinkmann et al. . |
| 3,932,360 | 1/1976 | Cerankowski et al. . |
| 4,129,741 | 12/1978 | Schmidt et al. ........................ 560/50 |
| 4,153,801 | 5/1979 | Schmidt et al. ...................... 548/312 |
| 4,169,206 | 9/1979 | Mazanek et al. ...................... 560/50 |
| 4,180,644 | 12/1979 | Marquis et al. ........................ 528/68 |
| 4,224,417 | 9/1980 | Hajek et al. ........................... 521/166 |
| 4,247,677 | 1/1981 | Schmidt et al. ....................... 528/68 |
| 4,260,729 | 4/1981 | Schmidt et al. ....................... 528/68 |
| 4,328,322 | 5/1982 | Baron ................................... 521/163 |
| 4,386,218 | 5/1983 | Rasshofer et al. ..................... 564/38 |
| 4,504,538 | 3/1985 | Mussallem, Jr. ...................... 428/167 |
| 4,515,923 | 5/1985 | Fauss ..................................... 564/61 |
| 4,525,534 | 6/1985 | Rasshofer .............................. 528/60 |
| 4,540,720 | 9/1985 | Rasshofer et al. .................... 521/159 |
| 4,565,645 | 1/1986 | Rasshofer .............................. 564/414 |
| 4,578,500 | 3/1986 | Rasshofer et al. .................... 564/393 |
| 4,843,107 | 6/1989 | Ruckes et al. ......................... 526/57 |
| 4,843,108 | 6/1989 | Ruckes et al. ......................... 528/57 |

FOREIGN PATENT DOCUMENTS

| | | |
|---|---|---|
| 2948419 | 8/1981 | Fed. Rep. of Germany . |
| 3223400 | 12/1983 | Fed. Rep. of Germany . |
| 5007829 | 1/1980 | Japan . |
| 5040742 | 3/1980 | Japan . |
| 1033912 | 6/1966 | United Kingdom . |
| 1117494 | 6/1968 | United Kingdom . |
| 2103536 | 2/1983 | United Kingdom . |
| 7900161 | 4/1979 | World Int. Prop. O. . |

OTHER PUBLICATIONS

H. John, J. Prakt. Chemie, vol. 130, pp. 314 et seq. (1931).

H. John, J. Prakt. Chemie, vol. 130, pp. 332 et seq. (1931).

H. Ulrich et al., Journal of Organic Chemistry (1968) pp. 3928-3930.

*Primary Examiner*—Donald G. Daus
*Attorney, Agent, or Firm*—Joseph C. Gil; Richard E. L. Henderson

[57] ABSTRACT

Polyamines containing primary amino groups are prepared in a single stage process by hydrolyzing an isocyanate in the presence of a catalyst incorporable through an NCO reactive group and a water-miscible aprotic-dipolar solvent. This hydrolysis is carried out at from 20° to 210° C. with the reactants being in substantially homogeneous phase. The isocyanate starting material has an NCO content of from 0.5 to 40% by weight. The catalyst is used in a quantity of at least 0.0001% by weight, based on 100% by weight of isocyanate compound. The water-miscible solvent is used in a quantity of at least 10% by weight, based on 100% by weight of isocyanate compound. The polyamines thus produced are particularly useful in the production of polyurethanes.

14 Claims, No Drawings

CATALYTIC HYDROLYSIS PROCESS FOR POLYAMINES

This application is a continuation-in-part of application Ser. No. 07/239,143, filed Aug. 31, 1988, now abandoned, which is a continuation of application Ser. No. 06/908,535, filed Sept. 16, 1986 and now abandoned.

BACKGROUND OF THE INVENTION

This invention relates to a single-stage process for the production of polyamines containing primary amino groups preferably aromatic amino groups and to the polyamines thus produced.

It is known that aromatic isocyanates may be converted into primary aromatic amines by acidic hydrolysis. Unfortunately, the reaction is far from complete, because the amine formed during hydrolysis reacts with unreacted isocyanate to form the corresponding urea. This further reaction cannot be prevented even by using an excess of strong mineral acid. A more recent example of this process can be found in JP-PS 55/007,829.

DE-B 1,270,046 describes a process for the production of defined, primary aromatic amines containing polyalkylene glycolether segments, in which reaction products of aromatic diisocyanates or triisocyanates with polyalkylene glycolethers and/or polyalkylene glycolthioethers (preferably those having molecular weights of from 400 to 4000) are reacted with secondary or tertiary carbinols and then subjected to thermal decomposition at high temperatures in an inert solvent (optionally in the presence of acidic catalysts). The high decomposition temperature and the formation of flammable, readily volatile alkenes which are explosive in admixture with air during thermal decomposition of the urethane are disadvantages of this disclosed process.

DE-B 1,694,152 discloses production of prepolymers containing at least two terminal amino groups by reaction of hydrazine, aminophenyl ethylamine or other diamines with an NCO prepolymer of a polyether polyol and polyisocyanate (NCO:NH ratio 1:1.5 to 1:5). Unreacted amine must be carefully removed in another step because it has a strong catalytic effect on the reaction with polyisocyanates, leading to short processing times.

Another method of synthesizing polyamines containing urethane groups is described in French Patent No. 1,415,317. NCO prepolymers containing urethane groups are converted with formic acid into the N-formyl derivatives which are hydrolyzed to terminal aromatic amines. The reaction of NCO prepolymers with sulfamic acid in accordance with DE-P 1,155,907 also gives amino terminated compounds. In addition, DE-B 1,215,373 discloses that relatively high molecular weight aliphatic preadducts containing secondary and primary amino groups may be obtained by reaction of relatively high molecular weight hydroxyl compounds with ammonia under pressure at elevated temperature in the presence of catalysts. U.S. Pat. No. 3,044,989 discloses that such compounds may be obtained by reaction of relatively high molecular weight polyhydroxyl compounds with acrylonitrile, followed by catalytic hydrogenation. According to DE-A 2,546,536 and U.S. Pat. No. 3,865,791, relatively high molecular weight terminal compounds may also be obtained by reaction of NCO prepolymers with eneamines, aldimines or ketimines containing hydroxyl groups, followed by hydrolysis. Another possibility for synthesizing polyamines containing urethane and ether groups lies in the ring opening which occurs during the reaction of isatoic acid anhydride and diols. Polyamines such as these are described, for example, in U.S. Pat. No. 4,180,644 and in DE-A Nos. 2,019,432, 2,619,840, 2,648,774 and 2,648,825. The poor reactivity of the aromatic ester amines obtained in this way is a disadvantage in numerous applications.

Poor reactivity is also a disadvantage of the compounds containing amino and ester groups which may be obtained in accordance with U.S. Pat. No. 4,504,538 by reaction of polyether polyols with p-aminobenzoic acid ethylester. Those amino compounds which may be obtained by reaction of polyols with nitrobenzoic acid chloride and subsequent reaction of the nitro groups to amino groups also exhibit poor reactivity. (DE-OS 2,511,093, EP-A 32,547, JP 55/040,742).

The reaction of nitroaryl isocyanates with polyols and subsequent reduction of the nitro groups to aromatic amines is also known (U.S. Pat. No. 2,888,439). The primary disadvantage of such processes lies in the high costs of the reduction step.

It is also known that certain heteroaromatic isocyanic acid esters may be converted into heteroaromatic amines by basic hydrolysis. However, the hydrolysis conditions described by H. John in *J. Prakt. Chemie*, 130, 314 et (1931) for two specific heteroaromatic monoisocyanic acid esters are not only totally unsuitable for the conversion of poly-NCO-compounds into aliphatic and/or aromatic amines, they are also dangerous.

According to the teaching of the DE-OS 2,948,419 and DE-OS 3,039,600 multistage processes for the production of polyamines by alkaline hydrolysis of NCO preadducts with excess quantities of base (alkali hydroxides) at low temperatures to carbamates, acidification with equivalent or excess quantities of mineral acids or acidic ion exchanger resins with carbamate decomposition, optionally followed by neutralization of excess quantities of acid with base, and subsequent isolation of the polyamines, have been proposed.

According to DE-OS 3,131,252, the carbamates prepared in a first stage by hydrolysis with alkali hydroxides may be decomposed by subsequent heat treatment of form polyamines.

Single-stage processes are described in DE-OS 3,223,400, 3,223,398 and 3,223,397. "Ether solvents" are used together with tertiary amines as catalysts in DE-OS 3,223,400. Polar solvents, such as dimethylformamide, together with −0.1% by weight (to 100% by weight of isocyanate compound) of tertiary amine or with 0.1 to 10 g of alkali hydroxides, alkali silicates, or alkali cyanides are used as catalysts in DE-OS 3,223,398. Polar solvents, such as DMF, together with 0.01 to 25% by weight of carbonates or carboxylates are used as catalysts in DE-OS 3,223,397.

These known processes for the production of polyamines are all complicated. Even in the last-mentioned, simpler processes for the conversion of polyisocyanates into polyamines, further simplification would be desirable to enable polyamines to be obtained more economically. The following features of a process for producing polyamines would be advantageous:

(1) no filtration step necessary, (2) no separation of a tertiary amine catalyst by distillation necessary, (3) drastic reduction in the quantity of catalyst required, and (4) substantially quantitative conversion of NCO groups into $NH_2$ groups.

SUMMARY OF THE INVENTION

It has now been found that polyamines containing primary amino groups can be obtained by single-stage hydrolysis of polyisocyanates to polyamines in substantially quantitative yields without the filtration, separation and large quantities of tertiary amine catalyst required in prior art processes. This is achieved by hydrolyzing an isocyanate in the presence of a catalyst that can be incorporated through NCO-reactive groups and in the presence of a dipolar-aprotic solvent at a temperature at most preferably of at least 50° C. Water-miscible solvents are used to achieve substantially homogeneous dissolution of the NCO-compound, water and the catalyst. One of the most suitable solvents is dimethyl formamide.

DETAILED DESCRIPTION OF THE INVENTION

It is known (e.g., from DE-AS 1,235,499) that solutions of NCO prepolymers in dimethyl formamide may be converted into highly viscous solutions suitable for spinning elasthane filaments or for coatings using substantially equivalent quantities of water (80 to 120%. of the theoretical) with chain extension through urea groups. That a different reaction occurs when the NCO compound is reacted with an excess quantity of water in the presence of incorporable catalysts and that low molecular weight amines are obtained is surprising.

It is also known that isocyanates react with dialkyl formamides to form formamidines (H. Ulrich et al, *J. Org. Chem.*, 33, 3928–3930 (1968)). This reaction does not, however, interfere with the smooth hydrolysis reaction to polyamines in the process of the present invention.

A considerable advantage of the process of the present invention lies in the fact that with the inventively used catalyst no salt formation occurs with the eliminated $CO_2$. This usually occurs when alkali hydroxides are used. Consequently considerably quantities of alkali carbonates or alkali hydrogen carbonates must be filtered off.

Since the catalysts used in accordance with the present invention are readily soluble in the reaction medium, the distribution equilibria encountered in cases where rapidly sedimenting alkali carbonates or hydrogen carbonates are used (as in DE-OS 3,223,397) do not occur in the present invention. In general, the quantities of catalyst remaining in the amine product are not troublesome by virtue of the small quantity preferably used. In addition, compounds which are not catalytically active or which at least are far less catalytically active in regard to the isocyanate polyaddition reaction generally form during the reaction, during working up of the reaction mixture and during storage of the amine product.

The catalysts of the present invention are particularly suitable for the hydrolysis of NCO prepolymers based on polyesters, because the mild reaction conditions do not promote splitting of the ester group to any significant extent during the hydrolysis reactions. These catalysts are readily obtainable and inexpensive.

The present invention relates to a process for the production of polyamines containing primary amino groups by hydrolysis of compounds containing NCO groups in an aqueous medium in a single-stage process.

More specifically, compounds containing NCO groups, preferably aromatic NCO groups, with an NCO content of from 0.5 to 40% by weight, preferably from 1.2 to 25% by weight and more preferably from 1.5 to 15% by weight are hydrolyzed with at least one mole of water for each equivalent of NCO-groups in the presence of a through at least one NCO reactive group incorporable catalyst selected from (1) compounds containing an aromatic carboxylic acid or phenolic group which has been at least partially neutralized and/or (2) basic compounds containing one or more nitrogen atoms which are not reactive in the context of an isocyanate addition reaction and/or (3) other catalysts that can be incorporated through NCO-reactive groups and in the presence of a water-miscible aprotic-dipolar solvent in a quantity of at least 10% by weight based on 100% by weight of the compound containing NCO groups. Compounds which contain one or more hydroxy and/or amino and/or thiol groups attached to aliphatic, cycloaliphatic, heterocyclic, or aromatic radicals and which are not catalytically active in the reaction environment may optionally be included. This hydrolysis is carried out in substantially homogeneous phase at a temperature from 20 to 210° C., preferably from 25 to 165° C., most preferably of from 50 to 165° C. In case the reaction is carried out at atmospheric pressure, a reaction temperature of from 75 to 135° C. should be maintained. Acid treatment may optionally be carried out during or after the hydrolysis.

In a preferred embodiment, a combination of basic alkali carboxylates, carbonates, hydrogen carbonates, and hydroxides, or alkaline earth carboxylates, carbonates, hydrogen carbonates, and hydroxides with alkali salts of hydroxycarboxylic acids, amino carboxylic acids, and t-aminoalcohols is used as the catalyst. This combination is used in quantities of from 0.0001 to 10% by weight, based on 100% by weight of isocyanate compound.

The hydrolysis of the present invention is preferably carried out in the presence of water in from 2 to 10 times the stoichiometric quantity, based on NCO.

In another preferred embodiment, the hydrolysis is carried out in the presence of a water-miscible solvent containing carboxylic acid dialkylamide, lactam, tetraalkyl urea, sulfone, sulfoxide, and/or phosphordialkylamide groups, which solvent boils at a temperature in the range of from 56 to 250° C. Such solvent is used in quantities of at least 50% by weight, based on 100% by weight of the compound containing NCO groups.

The hydrolysis is most advantageously carried out at temperatures in the range from 75 to 135° C. at atmospheric pressure.

It is also of advantage to carry out hydrolysis of the polyamines in a continuous reaction.

The invention also relates to the polyamines obtained by the process described above. These polyamines contain from 0.19 to 20.3% by weight of $NH_2$ groups and may be used as a reaction component in the production of polyurethanes.

Polyamines produced by the process of the present invention contain from 0.19 to 20.3% by weight, preferably from 0.46 to 11.3% by weight and more preferably from 0.58 to 6.7% by weight primary amino groups. Polyamines containing aromatically bound primary amino groups are preferred. Polyamines produced from tolylene diisocyanate are particularly preferred.

The NCO compounds containing two or more, preferably aromatic, NCO groups which may be used in the process of the present invention (hereinafter referred to as "NCO compounds") are modified polyisocyanates of the type obtained by conversion of some of the isocyanate groups to urethane, urea, biuret, uret dione, isocyanurate, and/or uretone imine groups; or so-called NCO prepolymers of polyfunctional compounds containing NCO-reactive H-groups and having a molecular weight of from 62 to 12,000 and preferably from 400 to 6000 and (excess) quantities of aromatic polyisocyanates or, optionally, semiprepolymers of NCO prepolymers and additional low molecular weight polyisocyanates.

Examples of suitable modified aromatic polyisocyanates include polyisocyanates containing urethane groups (formed by modification with low molecular weight polyols), polyisocyanates containing urea groups (modification with water, DE-PS 1,230,778), polyisocyanates containing biuret groups (U.S. Pat. Nos. 3,124,605 and 3,201,372, British Patent No. 899,050), polyisocyanates containing isocyanurate groups (DE-PS Nos. 1,022,789 and 1,222,067), and dimeric or oligomeric polyisocyanates containing dione or uretone imine groups. All of these modified aromatic polyisocyanates are known compounds or may be obtained by known methods. Many uretdione polyisocyanates are described in "Analytical Chemistry of the Polyurethanes", Vol. 16/III, High Polymers Series (Wiley 1969).

Modified polyisocyanates containing urethane and/or urea and/or biuret and/or uretdione and/or isocyanurate and/or uretone imine groups, which are suitable for use in the process of the present invention generally have an NCO content of from 5 to 40% by weight, preferably from 10 to 25% by weight.

The NCO compounds used in the process of the present invention are preferably NCO prepolymers of the type obtained in known manner by reaction of low molecular weight and/or relatively high molecular weight compounds containing hydroxy and/or amino and/or thiol groups as reactive groups (molecular weight from 62 to approx. 12,000) with an excess of polyisocyanate.

Polyisocyanates suitable for use in the preparation of the compounds containing free NCO-groups are, in principle, any aromatic, aliphatic and heterocyclic polyisocyanates of the type described, for example, by W. Siefken in *Justus Liebigs Annalen der Chemie*, 562, pp. 75–136. For example, suitable isocyanates include those corresponding to the formula $Q(NCO)_n$ where n is 2 to 4, preferably 2, and Q is a hydrocarbon radical containing from 4 to 15 carbon atoms, an aromatic hydrocarbon radical containing from 6 to 15 carbon atoms and preferably from 6 to 13 carbon atoms, for example 1,3-and 1,4-phenylene diisocyanate, 2,4- and 2,6-tolylene diisocyanate and mixtures of these isomers, diphenylmethane-2,4'- and/or -4,4'- and/or -2,2- diisocyanates, including the alkyl- and chlorine-substituted derivatives, and naphthylene-1,5-diisocyanate. Other suitable diisocyanates are the 2,4'-diisocyanatodiphenylsulfides described in DE-A 2,922,966 and the alkyl-substituted diphenylmethane diisocyanates described, for example, in EP 24,665 and in DE-A 2,935,318. Aliphatic and/or cycloaliphatic polyisocyanates, such as 1,6-hexane diisocyanate, lysine methylester diisocyanate, isophorone diisocyanate, the dicyclohexylmethane diisocyanate isomers, biuret-containing and isocyanurate-containing (for example trifunctional) polyisocyanates based on 1,6-hexane diisocyanate or isophorone diisocyanate may also be used.

Other suitable polyisocyanates are, for example, triphenylmethane-4,4',4"-triisocyanate; polyphenyl-polymethylene-polyisocyanates of the type obtained by phosgenating aniline-formaldehyde condensates and described, for example, in British Patent Nos. 874,430 and 848,671; m- and p-isocyanatophenylsulfonyl isocyanates according to U.S. Pat. No. 3,454,606, perchlorinated aryl polyisocyanates of the type described, for example, in DE-AS 1,157,601 (U.S. Pat. No. 3,277,138); polyisocyanates containing isocyanurate groups of the type described, for example, in U.S. Pat. No. 3,001,973, in DE-PS Nos. 1,022,789, 1,222,067, 1,027,394, 1,929,034, and 2,004,048: polyisocyanates containing urethane groups of the type described, for example in BE Patent No. 752,261 or in U.S. Pat. Nos. 3,394,164 and 3,644,457; polyisocyanates containing acylated urea groups according to DE-PS 1,230,778; and polyisocyanates obtained by telomerization reactions of the type described, for example, in U.S. Pat. No. 3,654,196. Diaryl alkylene diisocyanates obtained by polymerization of acrylonitrile and, optionally, other ethylenically unsaturated monomers in the diaryl alkylene diisocyanates by the process according to EPA 37 112 (U.S. Pat. No. 4,238,500), may also be used.

In general, it is preferred to use the commercially readily obtainable polyisocyanates, for example, 2,4- and 2,6-tolylene diisocyanate, and mixtures of these isomers ("TDI"), polyphenyl-polymethylene-polyisocyanates of the type obtained by phosgenation of aniline-formaldehyde condensates ("crude MDI"), and polyisocyanates containing urethane groups, isocyanurate groups or urea groups ("modified polyisocyanates"). Particular preference is attributed to the modified polyisocyanates derived from 2,4- and/or 2,6-tolylene diisocyanate (TDI) and from 4,4'-and/or 2,4'- and/or 2,2'-diphenylmethane diisocyanate (MDI). In commercial terms, the greatest significance is attributed to the use of TDI and MDI (or isomer mixtures thereof) for the production of the NCO-prepolymers.

For the production of the NCO-prepolymers, it is preferred to use relatively high molecular weight compounds (molecular weight 400 to 12,000 and more especially from 400 to 6000) containing at least 1 to 8, preferably 2 to 4, more especially 2 to 3, reactive hydroxyl, amino, and/or thiol groups (preferably hydroxyl groups) as reactive groups per mole. For example, it is possible to use the polyacetals, polythioethers, polycarbonates, polyamides, polysiloxanes, and/or polybutadienes containing isocyanate-reactive groups which are commonly encountered in polyurethane chemistry, particularly polyesters, polylactones, and polyethers, but especially polyethers containing hydroxyl groups.

The polyethers containing at least two, generally two to eight and preferably two to three, hydroxyl groups which are preferably used in accordance with the invention are known and may be obtained, for example, by polymerization of epoxides (such as ethylene oxide, propylene oxide, butylene oxide, tetrahydrofuran, styrene oxide, or epichlorohydrin) themselves in the presence of, for example, Lewis catalysts, such as $BF^3$, or by addition of these epoxides (preferably ethylene oxide and propylene oxide) optionally in admixture or successively, with starter components containing reactive hydrogen atoms, such as water, alcohols, ammonia, or amines. Examples of starter components are ethylene glycol, 1,3- or 1,2-propanediol, trimethylol propane, glycerol, sorbitol, 4,4'dihydroxydiphenyl propane, aniline, ethanolamine, or ethylene diamine. Sucrose polyethers and also formitol- or formose-started polyethers may also be used in accordance with the invention. In many cases, it is preferred to use polyethers predominantly containing primary OH-groups (up to 90% by weight), based on all the OH-groups present in the polyether.

Polybutadienes containing OH-, NH-, and/or SH-groups are also suitable for use in accordance with the invention. See Progress Org. Coatings, Vol, 7 (3) 289–329 (1979).

Suitable polyacetals include the compounds obtainable from glycols, such as di- or triethylene glycol, 4,4'dihydroxyethoxydiphenylmethane, hexanediol, and formaldehyde, or by polymerization of cyclic acetals, such as trioxane.

Suitable polycarbonates containing hydroxyl groups are known and may be obtained by reaction of diols, such as 1,3-propanediol, 1,4-butanediol, and/or 1,6-hexanediol, di-, trior tetraethylene glycol or thiodiglycol, with diaryl carbonates, for example diphenyl carbonate, or phosgene (DE-B 1,694,080, 1,915,908 and 2,221,751; DE-A 2,605,024).

Preferred polyesters of dicarboxylic acids and diols are those of adipic acid and (less preferably) isophthalic acid and straight-chain and/or branched diols, also lactone polyesters, preferably based on caprolactone and starter diols.

Among the polythioethers, particular reference is made to the condensation products of thiodiglycol on its own and/or with other glycols.

Polyhydroxyl compounds already containing urethane or urea groups and optionally modified natural polyols may also be used. Adducts of alkylene oxides with phenol-formaldehyde resins or even urea-formaldehyde resins may also be used in accordance with the invention. Amide groups may also be introduced into the polyhydroxyl compounds, for example, in accordance with DE-A 2,559,372.

According to the invention, it is also possible to use polyhydroxyl compounds containing high molecular weight polyadducts or polycondensates or polymers in finely dispersed or dissolved form. Polyhydroxyl compounds such as these are obtained, for example, by carrying out polyaddition reactions (for example, reactions between polyisocyanates and aminofunctional compounds) or polycondensation reactions (for example, between formaldehyde and phenols and/or amines) in situ in the above-mentioned compounds containing hydroxyl groups. Processes of this type are described, for example, in DE-B 1,168,075 and 1,260,142 and in DE-A 2,324,134, 2,423,984, 2,512,385, 2,512,385, 2,513,815, 2,550,796, 2,550,797, 2,550,833, 2,550,862, 2,633,293, and 2,639,254. However, it is also possible in accordance with U.S. Pat. No. 3,869,413 or 2,550,860 to mix a prepared aqueous polymer dispersion with a polyhydroxyl compound and then to remove the water from the mixture.

Polyhydroxyl compounds modified by vinyl polymers of the type obtained, for example, by polymerization of styrene and acrylonitrile in the presence of polyethers (U.S. Pat. Nos. 3,383,351, 3,304,273, 3,523,093, and 3,110,695: DE-B 1,152,536) or polycarbonate polyols (DE-PS 1,769,795; U.S. Pat. No. 3,647,909) are also suitable for the process according to the invention.

Representatives of the above-mentioned compounds which may be used in accordance with the invention are described, for example, in High Polymers, Vol. XVI, "Polyurethanes, Chemistry and Technology" by Saunders and Frisch, Interscience Publishers, New York/London, Vol. I, 1962, pages 32–42 and 44–54, and Vol, II, 1964, pages 5–6 and 198–199, and in Kunststoff-Handbuch, Vol. VII, Vieweg-Hochtlen, Carl-Hanser Verlag, Munich, 1966, for example, on pages 45–71. It is, of course, possible to use mixtures of the above-mentioned compounds containing at least two isocyanate reactive hydrogen atoms and having a molecular weight of from 400 to 12,000, for example, mixtures of different polyethers.

Other starting components which may be used, optionally in part, for the production of the NCO-prepolymers used in the process according to the invention are compounds containing at least two isocyanate-reactive hydrogen atoms and having a molecular weight of from 18 to 399 and preferably of from 62 to 399. In this case, too, the compounds in question are compounds containing water and/or hydroxyl groups and/or amino groups and/or thiol groups, preferably hydroxyl groups, of the type known to those skilled in polyurethane chemistry as chain-extending agents or cross-linking agents. These compounds generally contain from 2 to 8 and preferably from 2 to 4 isocyanate-reactive hydrogen atoms. In this case, too, it is possible to use mixtures of different compounds containing at least two isocyanate-reactive hydrogen atoms and having a molecular weight of from 62 to 399.

Examples of compounds of such as these are water, ethylene glycol, 1,2- and 1,3-propanediol, 1,4- and 2,3-butanediol, 1,5-pentanediol, 1,6-hexanediol, 1,8-octanediol, neopentyl glycol, 1,4-bis(hydroxymethyl)-cyclohexane, 2-methyl-1,3-propanediol, dibromobutenediol, glycerol, trimethylol propane, 1,2,6-hexanetriol, trimethylol ethane, pentaerythritol, quinitol, mannitol and sorbitol, dianhydrosorbitol and dianhydromannitol, castor oil, di-, triand tetraethylene glycol, di-, di-, tri- and tetrapropylene glycol, dibutylene glycol, higher polyethylene, polypropylene, or polybutylene glycols having a molecular weight of up to 399, 4,4'-dihydroxydiphenyl propane, dihydroxyethyl hydroquinone, ethanolamine, diethanolamine, N-methyldiethanolamine, triethanolamine, and 3-aminopropanol.

Other suitable low molecular weight polyols are the mixtures of hydroxyaldehydes and hydroxyketones ("formose") and the polyhydric alcohols ("formitol") obtainable therefrom by reduction, of the type formed in the autocondensation of formaldehyde hydrate (DE-A 2,639,084, 2,714,084).

Aliphatic diamines suitable for use in accordance with the invention are, for example, ethylene diamine, 1,4-tetramethylene diamine, 1,6-hexamethylene diamine, 1,12-dodecamethylene diamine and mixtures thereof, perhydro-2,4'-and -4,4'-diaminodiphenylmethane, p-xylylene diamine, bis(3-aminopropyl)methylamine, diaminoperhydroanthracenes, and cycloaliphatic triamines according to DE-A 2,614,244. Hydrazine and substituted hydrazines, for example, methyl hydrazine or dihydrazide compounds, may also be used in accordance with the invention.

Examples of aromatic diamines are the diamines containing ether groups according to DE-A 1,770,525 and 1,809,172 (U.S. Pat. Nos. 3,654,364 and 3,736,295), 2-halogen-1,3-phenylene diamines optionally substituted in the 5-position (DE-A 2,001,772, 2,025,896 and 2,065,869), 3,3'-dichloro-4,4'-diaminodiphenylmethane, tolylene diamines, 4,4'-diaminodiphenylmethane, 4,4'-diaminodiphenyl disulfides (DE-A 2,404,976), diaminodiphenyl dithioethers (DE-A 2,509,404), aromatic diamines substituted by alkylthio groups (DE-A 2,638,760), aromatic diamines containing sulfonate or carboxylate groups (DEA 2,720,166), and the high-melting diamines mentioned in DE-A 2,635,400. Examples of aliphatic-aromatic diamines are the aminoalkylthioanilines according to DE-A 2,734,574.

Other, albeit less preferred compounds which may be used in the production of the NCO-compounds used in the process according to the invention are organofunctional polysiloxanes containing two terminal isocyanate reactive groups and structural units of the formula -O-Si(R)$_2$-, where R is a C$_1$–C$_4$ alkyl group or a phenyl group, but preferably a methyl group. According to the invention, suitable starting materials are both the known pure polysiloxanes which contain terminal organofunctional groups and also the siloxane polyoxyalkylene copolymers containing terminal organofunctional groups.

The free NCO-prepolymers preferably containing aromatically bound isocyanate groups may be obtained in known manner by reaction of the reactants either in the melt or in solution. The equivalent ratio of NCO-groups to groups containing active hydrogen atoms (preferably OH-groups) is always greater than 1 and, in general, should be between 1.5:1 and 2.8:1. It is, of course, possible to use an even larger excess of polyisocyanate. The NCO-prepolymers ("NCO-preadducts") generally have an oily to wax-like consistency, depending on the starting components selected. If the NCO::OH ratio is greater than 2, the NCO-preadducts obtained are for the most part non-extended, whereas an NCO:OH ratio below 2 produces an increase in the average molecular weight of the NCO-preadducts. As already explained, it is also possible to use low molecular weight polyols as chain extending agents in the production of the NCO-prepolymers in addition to relatively high molecular weight starting compounds. In this case, the NCO preadducts obtained are also of relatively high molecular weight.

If the NCO-prepolymers thus obtained are subjected to distillation (e.g., using a thin-layer evaporator to remove the monomeric polyisocyanates), products containing very little, if any, monomeric diamine are obtained in the process according to the invention.

The NCO compounds used in the process of the present invention are preferably NCO prepolymers of the type obtained in known manner by reaction of low molecular weight and/or relatively high molecular weight compounds containing hydroxy and/or amino and/or thiol groups as reactive groups (molecular weight from 62 to approx. 12,000) with an excess of polyisocyanate.

NCO-prepolymers obtained from relatively high molecular weight polyols (molecular weight 400 to 12,000), preferably polyether polyols, optionally in the presence of chain-extending agents (molecular weight 62 to 399), by reaction with aromatic diisocyanates in an equivalent ratio of from 1:1.5 to 1:2.8 (preferably of from about 1:1.5 to 1:2) are particularly preferred in the process of the present invention.

The NCO-prepolymers used have an NCO content of from 0.5 to 30% by weight and preferably of from 1.2 to 25% by weight, more preferably from 1.5 to 10% by weight.

The NCO compounds preferably used are NCO prepolymers based on relatively high molecular weight difunctional or trifunctional polyether, polyester, polycarbonate, and/or polycaprolactone polyols, which prepolymers have from 1.5 to 15% by weight aromatically bound NCO groups. NCO compounds containing free carboxyl groups and/or carboxylate groups and/or t-amino groups are particularly advantageous.

However, so-called "semiprepolymers", i.e., mixtures of NCO prepolymers with other free polyisocyanates, which may have an even higher NCO content, for example up to 40% by weight may also be used. For practical and economical reasons, as well as the fact that the monomeric amines formed from the monomeric polyisocyanates can be troublesome in a number of applications, semiprepolymers are not preferred.

The compounds containing free NCO groups in the form of (generally urethane-group-free) modified isocyanates or in the form of (urethane-group-containing) NCO prepolymers or "semiprepolymers" have a total NCO group content of from 0.5 to 40% by weight, preferably of from 1.2 to 25% by weight and more preferably of from 1.5 to 10% by weight.

At least one mole of water per equivalent of NCO is used in the hydrolysis of the present invention. It is preferred to use an excess of water, preferably from 2 to 10 moles of water to one equivalent of NCO. Water is generally used in a quantity of more than 1% by weight, based on 100% by weight of NCO compound.

Incorporable catalysts are used as the catalyst component. Such catalysts include compounds which contain at least one NCO-reactive group and a group which catalyzes the reaction of NCO-groups to NH$_2$-groups.

Suitable NCO-reactive groups are, in particular, hydroxy, mercapto, and primary or secondary amino groups, as well as other groups containing Zerewitinoff active hydrogen and, in principle, groups which react with NCO-groups by mechanisms other than by the isocyanate addition reaction, for example, ketene aminal groups (U.S. Pat. No. 4,342,841; D. F, Regelman et al, ACS Symposium Series 270, page 125 (1985)).

Suitable catalytically active groups include anionic groups, such as alkoxide, mercaptide, (thio)phenolate, carboxylate and other acid groups; organometallic groups, such as dialkyltin groups; t-amino groups such as trialkylamino groups; and amidine groups such as 2-tetrahydropyrimidine groups.

Suitable catalysts (1) are (ali)cyclic or aromatic carboxylic acids or phenols (preferably aromatic carboxylic acids or phenols) in the form of their basic alkali and alkaline-earth metal salts which are at least partly soluble in the reaction mixture, such as hydroxyacetic acid (glycolic acid), lactic acid, 2,2,-bis(hydroxymethyl)propionic acid (dimethylolpropionic acid), malic acid, tartaric acid, citric acid, mucic acid, mandelic acid, mercaptoacetic acid, thiomalic acid, aminoacetic acid, methylaminoacetic acid, (N-methylglycine), 3-aminopropanoic acid (alanine), 4-aminobutanoic acid, 6-aminohexanoic acid (aminocaproic acid), lysine, aspartic acid, gltamic acid, N-phenylaminoacetic acid, aminophenols such as o-, m-, p-aminophenol, 4-ethylaminophenol, 2-, 3- and 4-aminobenzoic acid, 3-aminocinnamic acid, 4-amino- (1,1'-biphenyl)-4-carboxylic acid, aminophthalic acid, hydroxybenzoic acids, and o-, m- and p-aminophenoxyacetic acid.

Examples of catalysts (2) are 1-amino-2-diethylaminoethane, N,N',N"-trimethyldiethylene triamine, 1-amino-2-dimethylaminopropane, 1-amino-2-diethylaminopropane, bis(3-aminopropyl)methylamine, 4-amino-1-diethylaminopentane, N,N-dimethyl-1,3-benzenediamine, N,N-dimethyl- and N,N-diethyl-1,4-benzenediamine, 2-[(4-aminophenyl) ethylamino]ethanol, 3-amino-1-dimethylamino-4-methylbenzene, 2-and 4-amino-N,N-dimethylbenzylamine, 2-(dimethylamino)ethanol, 2-(2-dimethylaminoethoxy)ethanol, 2-diethylaminoethanol, 2-(2-diethylaminoethoxy)ethanol, 2-dibutylaminoethanol, N-methyldiethanolamine, N-butyl-diethanolamine, triethanolamine, N-methyl-N-(3-aminopropyl)ethanolamine, 3-dimethylamino1-propanol, 1-dimethylamino-2-propanol, 1-diethylamino2-propanol, bis(2-hydroxypropyl)methylamine, 1-methylpiperazine, 1-piperazinoethanol, 1-piperazinoethylamine, 2-amino and 4-aminopyridine, 1,3,5-tris(hydroxyethyl)hexahydro-s-triazine, 2-(N-butylanilino)ethanol, N,N-bis-(2-hydroxyethyl)aniline, 1-(N-ethylanilino)-2-propanol, and corresponding derivatives of o-, m- and p-toluidine.

Examples of catalysts in group (3) are organotin, organolead, organotitanium and organobismuth compounds containing hydroxy, amino, or mercapto groups.

The quantity of incorporable catalyst used should amount to at least 0.0001% by weight based on 100% by weight of the isocyanate compound, preferably from 0.005 to 5% by weight and more preferably from 0.2 to 2% by weight.

The process of the present invention is so effective that, in general, all catalysts suitable to the invention may be used in quantities such that their absolute solubility in the reaction mixture remains guaranteed. The use of large enough quantities of solid catalyst that part of the catalyst remains undissolved is unnecessary, economically unfavorable, and not preferred.

The catalysts according to the invention are preferably used on their own, although they may also be used in admixture with other catalyst compounds known from isocyanate chemistry where special effects are required.

The water-miscible/water-soluble aprotic-dipolar solvents used may be selected from the following classes:

(1) water-soluble aliphatic or cycloaliphatic acid amides containing from 1 to 10 carbon atoms, for example, dimethyl formamide, diethyl formamide, N-methylpyrrolidone, dimethyl acetamide, caprolactam, and formamide, preferably dimethyl formamide, dimethyl acetamide, and N-methylpyrrolidone;

(2) water-soluble tetraalkylated aliphatic ureas containing from 4 to 12 carbon atoms, for example, tetramethyl urea or tetraethyl urea;

(3) water-soluble aliphatic or cycloaliphatic sulfones or sulfoxides containing from 2 to 10 carbon atoms, for example, tetramethyl sulfone or dimethyl sulfoxide; and (4) water-soluble aliphatic or cycloaliphatic phosphoric acid amides, for example, hexamethyl phosphoric acid triamide.

The solvents may also be used in admixture in any ratio with one another. Of the solvents mentioned above, it is preferred to use those which boil at 56 to 250° C. (more preferably at 64 to 165° C.) under normal pressure because this simplifies workup.

Preferred water-miscible solvents are dimethyl formamide, dimethyl acetamide, N-methylpyrrolidone, and tetramethylene sulfone. It is particularly preferred to use dimethyl formamide as the sole solvent.

It is also possible, but not preferred, to use small quantities of solvents which are not completely miscible with water, such as propionitrile, methylethylketone, ethylacetate, or hydrocarbons.

The amount of water-miscible solvent employed in the process of the present invention should be at least 10, preferably at least 50 and more preferably at least 100%, by weight, based on 100% by weight of NCO compound, in the hydrolysis reaction mixture.

Water and solvent should be used in a quantity such that a substantially homogeneous (at most slightly clouded) or preferably a homogeneous, clear solution containing the NCO compound is formed at the reaction temperature. It is particularly preferred to use such a quantity of water that a mixture having only one phase, irrespective of the process temperature, is formed.

The catalytically active compounds are generally added to the solvents and water. In some cases, it is possible, but not preferred, to add them to the compound containing isocyanate groups.

To hydrolyze the NCO compound to polyamines having a sufficiently high amine number (high conversion rate), it is advantageous to maintain a concentration of the NCO compound of $\leq 50\%$ by weight in the reaction mixture. The higher the degree of dilution by solvent (rather than by water), the better the hydrolysis conversion generally will be. The higher the conversion of the NCO groups into $NH_2$ groups, the higher the amine number of the polyamine. In practice, a dilution limit is imposed solely by economic factors at the working up stage and is generally at around a 3% solution.

It is important to use at least enough water-miscible solvent for a substantially homogeneous and preferably completely homogeneous reaction mixture.

In a less preferred embodiment of this invention, "H-active" compounds containing two or more hydroxy, amino, and/or thiol groups may be added to the reaction mixture. These compounds which have already been mentioned include difunctional to optionally tetrafunctional compounds having a molecular weight of from 62 to 2000, more especially those containing at least two primary hydroxy groups, such as ethanediol, butanediol, propanediol, polyethylene glycols, trimethylol propane or the like. Compounds containing different "H-active groups", for example, amino alcohols, may of course also be used.

Compounds containing only one H-active groups such as methanol, ethanol, cyclohexanol, cyclohexylamine, aniline, and asymmetrical dimethyl hydrazine may be used as monofunctional chain terminators.

Pre-extension (i.e., isocyanate and already formed amine react with chain attachment to ureas) can occur as a secondary reaction in the process of the present invention. These secondary reactions may be largely suppressed by working in dilute solution, using the catalysts required in the present invention, and maintaining relatively high reaction temperatures (for example, in the range of from 70 to 135° C.). Although it is desirable that these secondary reactions should occur to the least possible extent, a certain degree of preextension is acceptable for economic reasons.

The reaction according to the present invention is preferably carried out in a homogeneous phase. By slight overdosage of the quantity of water or of the quantity of NCO compound, slight clouding of the reaction mixture may occur because the starting materials are no longer completely dissolved. However, where the reaction is carried out in a highly heterogeneous medium, for example, by excessive addition of water with precipitation of the NCO prepolymer, unsatisfactory products are obtained. The optimal mixing ratios depend upon the starting compounds and may be determined by a few simple preliminary tests.

The reaction may be carried out at temperatures in the range of from 50 to 165° C., although it is most preferably carried out at temperatures in the range of from 80 to 130° C. because it is at those temperatures that the best volume/time yields coupled with high solubility and surprisingly very little urea extension are obtained. It is particularly preferred to carry out the reaction at the boiling point of the mixture which, due to the presence of water, is generally in the range of from about 90 to 105° C. In certain cases, it may be necessary to carry out the reaction under pressure in order to work at sufficiently high temperatures.

The onset of the reaction is reflected in the almost spontaneous elimination of $CO_2$, even at low temperature, for example, at temperatures around 20° C. According to the invention, however, it is much more favorable to carry out the reaction at the higher temperatures indicated in order to suppress urea formation. It is important for the reactants to be very thoroughly and rapidly mixed with homogeneous dissolution, which is largely achieved by the use of the solvents. A similar effect is obtained by reduction in viscosity where the reaction is carried out at relatively high temperatures. The reaction may be carried out either continuously or in batches.

In one embodiment of the batch-type process, for example, the compound containing NCO groups is introduced into the aqueous mixture containing solvent and catalyst. This may be done by means of a dropping funnel or by injection through a nozzle where provisions have been made for uniform distribution by intensive stirring.

In one embodiment of the continuous process, which is particularly suitable for production on an industrial scale, the NCO compounds (optionally in solution) and the aqueous solution are separately delivered to a common reaction zone, intensively mixed and reacted, for example, in a continuous-flow mixer, and rapidly discharged from the mixer. The reactants may be introduced in measured quantities, for example, from graduated dropping funnels or by means of a piston and/or diaphragm metering pump or any other metering unit. In the case of continuous metering, it is preferred to mix, react, and discharge both components in a very short time (seconds or fractions of a second) using a suitable, optionally motor-driven machine.

The reaction of the isocyanate groups with the aqueous, catalyst-containing solvent phase can be facilitated by the presence of various additives. Thus, one or more commercial emulsifiers may be added for homogenization in quantities of, for example, from 0.01 to 1% by weight, based on 10% by weight of reaction mixture. However, this is unnecessary where homogeneous reaction mixtures (dissolved components) are used.

The flow mixers which may be used in the continuous embodiments of the process of the present invention include static mixers with fixed mixing elements or dynamic mixers with elements moving on the rotor-stator principle. They may either be heated or cooled. In the case of the static mixers, the necessary mixing energy may be supplied through the pumps whereas, in the case of the dynamic mixers, a separate motor drives the rotor. In every case, the conversion of the isocyanate groups to amino groups depends upon the power applied and the shear forces generated (i.e., upon the homogeneous, rapid distribution of the NCO compound in the reaction medium).

Suitable static mixers include mixers made up of simple mixing elements (for example coils) or complicated elements (for example packing mixers) or multichannel mixers. It is also possible to use mixing nozzles or the mixing changers in the HK machines manufactured by the Hennecke Company (Birlinghoven, Federal Republic of Germany) into which the starting products are injected under high pressure (countercurrent injection). Suitable dynamic mixers for the process of the present invention include the continuous-flow mixers which may be used on the stator-rotor principle in the same way as the known impeller homogenizers. Such mixers may not be used as feed units. The power applied for mixing is generally between about 1 and 10 KW per liter of capacity, depending upon the required degree of dispersion, the type of mixer used, and the viscosity of the starting materials.

After mixing, the mixture must be directly worked up into the polyamine, optionally after a brief after-reaction time of generally less than 5 minutes in which the reaction mixture is heated under gentle reflux (preferably under normal pressure) in order to remove as much of the carbon dioxide formed as possible. However, the reaction mixture may also be tempered for a longer period without disadvantage, although it is preferably worked up immediately after mixing.

Workup may be carried out continuously or in batches. The reaction mixture is usually worked up by distillation, by extraction, by phase separation, or by a combination of these methods.

The volatile constituents are distilled off, optionally under reduced pressure. In general, sump temperatures (in the remaining polyamine) of from 100 to 130° C. are maintained towards the end of evaporation.

Where a thin-layer evaporator is used, distinctly higher temperatures, for example, from 170 to 200° C., may be briefly reached in the polyamine.

Extraction processes, optionally after dilution with water, may be carried out with water-insoluble solvents (such as methylene chloride or chlorobenzene) but are not preferred. In some cases, phase separation of the reaction mixture by cooling occurs if hydrolysis has been carried out at relatively high temperatures and in the presence of relatively large quantities of water at the solubility limit. Phase separation may be accomplished or improved by addition of water. The aqueous phase optionally containing solvent and, in most cases, also the catalyst is separated off from the polyamine phase. In most cases, the aqueous phase may then be directly reused.

The polyamines obtained in accordance with the present invention after workup are generally colorless to faintly colored, medium-viscosity to high viscosity, and, optionally, relatively high melting products. Depending upon the starting materials from which they were produced, these polyamines may also contain urethane and/or urea and/or uretdione and/or isocyanurate and/or biuret groups and/or ether and/or acetal and/or carbonate and/or ester and/or thioether and/or dialkylsiloxane groups and/or the residues of polybutadienes which were already present in the NCO compounds. However, additional bonds may be formed through secondary reactions. For example, urea groups may be formed from already hydrolyzed fractions and residual NCO groups during the hydrolysis reaction. The quantity of primary amino groups present in the polyamines corresponds at most to the quantity of NCO groups in the NCO compounds, i.e., amounts to between 0.19 and 20.3% by weight $NH_2$, preferably to between 0.46 and 11.3% by weight $NH_2$ and more preferably to between 0.58 and 6.7% by weight $NH_2$.

By virtue of their low vapor pressure, the aromatic polyamines obtained in accordance with the invention are preferably used as reactants for optionally blocked polyisocyanates in the production of polyurethanes (polyurethane ureas), optionally cellular polyurethane plastics or polyurethane foams. They may even be combined with other low molecular weight (molecular weight 32 to 399) and/or relatively high molecular weight (molecular weight 400 to approximately 12,000) compounds containing isocyanate-reactive groups. Suitable starting components for the production of polyurethane plastics were mentioned previously in connection with prepolymer production and are also described in DE-A 2,302,564, DE-A 2,432,764 (U.S. Pat. No. 3,903,679) and in DE-AS Nos. 2,639,083, 2,512,385, 2,513,815, 2,550,796, 2,550,797, 2,550,833, 2,550,860, and 2,550,862. Auxiliaries and additives which may optionally be used in the production of polyurethanes are also mentioned in these publications.

The present invention also relates to the use of the polyamines produced in accordance with the invention for the production of polyurethane(urea)s. It is possible to produce elastomers, coatings, and filaments from melts, solutions, dispersions, or mixtures of reactive components by using the polyamines of the present invention.

The polyamines produced in accordance with the invention may also be used, for example, as coupling components for diazo dyes, as hardeners for epoxy and phenolic resins, and in any other known reactions involving amines, such as amide- or imide-forming reactions.

The process according to the invention is illustrated by the following Examples in which quantities are expressed in parts by weight or percentages by weight, unless otherwise indicated.

EXAMPLES

EXAMPLE 1

A mixture heated to 90° C. of 1750 g of N,N-dimethyl formamide (DMF), 50 ml of water, and 1 g of N,N-butyldiethanolamine was initially introduced into the reaction vessel. 500 g of a prepolymer (NCO content 3.65%) prepared by stirring 2,4-tolylene diisocyanate and polypropylene glycol (OH number 56) for 3 hours at 80° C. in an NCO:OH equivalent ratio of 2:1 were then added over a period of 20 minutes with evolution of $CO_2$. After the addition, the mixture was stirred for 5 minutes. The DMF and remaining water were then distilled off, first at 15 and later at 0.1 Torr. The product remained behind as a pale oil.

(NH+OH) number ($Ac_2O$/pyridine): 32.5 mg KOH/g
Acid number: 0.3 mg KOH/g
NH number ($HClO_4$): 35.9 mg KOH/g
TDA-content (HPLC): 0.064%

EXAMPLE 2

A mixture heated to 90° C. of 1750 g of DMF, 50 g of water, and 3 g of N,N-butyldiethanolamine was initially introduced into the reaction vessel. 500 9 of a prepolymer (NCO content 3.6%) prepared as described in Example 1 were then added with stirring over a period of 20 minutes, followed by working up as in Example 1.

NH number ($HClO_4$): 35.2 mg KOH/g

EXAMPLE 3

A mixture of 1100 g of DMF, 25 g of water, and 3 g of N,N-dimethylaminoethanol was initially introduced into the reaction vessel. 500 g of a prepolymer (NCO content 3.2%) prepared as described in Example 1 were then added over a period of 20 minutes with stirring at 90° C., followed by working up as in Example 1.

NH number ($HClO_4$): 34.8 mg KOH/g

EXAMPLE 4

A mixture heated to 95° C. of 1100 g of DMF, 25 g of water, and 0.1 g of methylaminoacetic acid sodium salt was initially introduced into the reaction vessel. 500 g of the prepolymer of Example 3 were then added dropwise with stirring over a period of 20 minutes, followed by working up as in Example 1.

NH number ($HClO_4$): 43.4 mg KOH/g
NH number ($Ac_2O$/pyridine): 46.3 mg KOH/g
Acid number: 0.2 mg KOH/g
TDA-content (HPLC): 0.397%

EXAMPLE 5

A mixture heated to 90° C. of 1100 g of DMF, 25 g of water, and 1 g of sodium ricinoleate was initially introduced into the reaction vessel. 500 g of the NCO prepolymer of Example 3 were then added with stirring over a period of 20 minutes, followed by working up as in Example 1.

NH number ($HClO_4$): 45.1 mg KOH/g
NH number ($Ac_2O$/pyridine): 46.7 mg KOH/g
Acid number: 0.2 mg KOH/g
TDA-content (HPLC): 0.401%

EXAMPLE 6

A mixture heated to 90° C. of 1100 g of DMF, 25 g of water, and 1 g of dimethylol propionic acid sodium salt was initially introduced into the reaction vessel. 500 g of the NCO-prepolymer of Example 3 were then added with stirring over a period of 20 minutes at that temperature, followed by working up as in Example 1.

NH number ($HClO_4$): 43.6 mg KOH/g
NH number ($Ac_2O$/pyridine): 50.5 mg KOH/g
Acid number: 0.2 mg KOH/g
TDA-content (HPLC): 0.530%

EXAMPLE 7

A mixture heated to 90° C. of 1100 g of DMF, 25 g of water, and 0.1 g of dimethylol propionic acid sodium salt was initially introduced into the reaction vessel. 500 g of a prepolymer (NCO content 3.4%) prepared from the same materials and in the same manner as the prepolymer described in Example 1 were then added with stirring over a period of 20 minutes at that temperature, followed by working up as in Example 1.

NH number ($HClO_4$): 43.5 mg KOH/g
NH number ($Ac_2O$/pyridine): 41.7 mg KOH/g
Acid number ($Ac_2O$/pyridine): 0.2 mg KOH/g
TDA-content (HPLC): 0.113%

EXAMPLE 8

A mixture heated to 90° C. of 1100 g of DMF, 25 g of water, and 5 g of dimethylol propionic acid sodium salt was initially introduced into the reaction vessel. 500 g of the prepolymer of Example 7 were then added with stirring over a period of 20 minutes at 90° C., followed by working up as in Example 1.

NH number (HClO$_4$): 39.1 mg KOH/g
(NH+OH) number (Ac$_2$O/pyridine): 36.4 mg KOH/g
Acid number: 0.4 mg KOH/g
TDA-content (HPLC): 0.034%

EXAMPLE 9

A mixture heated to 90° C. of 1750 g of DMF, 50 g of water, 3 g of N,N-butylethanolamine, and 0,005 g of NaOH was initially introduced into the reaction vessel. 500 g of an NCO prepolymer (NCO content 3.5%) prepared from the same materials by the same process as the prepolymer in Example 1 were then added over a period of 20 minutes at that temperature, followed by working up as in Example 1.

NH number (HClO$_4$): 46.5 mg KOH/g

EXAMPLE 10

A mixture heated to 90° C. of 2200 ml of dimethyl formamide (DMF), 50 ml of water, 3 g of N-butyldiethanolamine, and 0.01 g of NaOH was initially introduced into the reaction vessel. 1000 g of an NCO prepolymer (NCO content 3.4%) prepared by stirring tolylene diisocyanate and an ethylene butanediol-1,4 adipate with a hydroxyl number of 56 (ethylene glycol:-butanediol-1,4 ratio 1:1) at an NCO:OH ratio of 2:1 and a temperature of 80° C. for a period of 3 hours was added. The reaction product was worked up as in Example 1.

NH number (HClO$_4$): 40.3 mg KOH/g
NH number (Ac$_2$O/pyridine): 38.5 mg KOH/g
Acid number (Ac$_2$O/pyridine): 0.4 mg KOH/g
TDA-content: 0.384%

EXAMPLE 11

A mixture of 2.2 liter of DMF, 50 ml of water, and 0.1 g of NaOH was initially introduced into the reaction vessel at 90° C. 1000 g of the NCO prepolymer of Example 10 were then added at that temperature over a period of 20 minutes. After working up as in Example 1, 0.36 g of 2-ethylhexanoic acid was added.

NH number (HClO$_4$): 49.7 mg KOH/g
NH number (Ac$_2$O/pyridine): 46.4 mg KOH/g
Acid number (Ac$_2$O/pyridine): 0.7 mg KOH/g

EXAMPLE 12

A mixture of 1100 liter of DMF, 25 ml of water, and 3.86 g of NaOH was initially introduced into the reaction vessel. 500 g of a prepolymer (NCO content 4.9%) obtained by stirring a mixture of 1 mole of polypropylene glycol (OH number 56), 0.5 mole of dimethylol propionic acid, and 3 moles of tolylene diisocyanate for 4 hours at 80° C. were then added over a period of 20 minutes. Working up as described in Example 1 gave a polyamine having an NH number (HClO$_4$) of 37,6 mg KOH/g.

EXAMPLE 13

A mixture of 1100 g DMF, 25 g of water, and 0.1 g dimethylolpropionic acid sodium salt heated to 40° C. was introduced into the reaction vessel. 500 g of a prepolymer having an NCO content of 3.4% produced as in Example 1 were added over a period of 20 minutes with stirring. The mixture was then worked up in the same manner as described in Example 1.

NH number (HClO$_4$): 41.2 mg KOH/g
NH number (Ac$_2$O/pyridine): 41.1 mg KOH/g
Acid number (Ac$_2$O/pyridine): 0.2 mg KOH/g
TDA-content (HPLC): 0.024%

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A one step process for the production of polyamines containing primary amino groups comprising hydrolyzing
   (a) a compound containing NCO groups with an NCO content of from 0.5 to 40% by weight
   with
   (b) at least one mole of water for each equivalent of NCO groups in (a) in the presence of
   (c) a catalyst compound having at least one NCO-reactive group that is incorporated into (a) and having a catalytic group that catalyzes the reaction of NCO groups with NH$_2$ groups, wherein said catalytic group is selected from
      (1) an aromatic carboxylic acid or pheolic group, wherein said group has been at least partially neutralized,
      (2) a basic group containing one or more nitrogen atoms that are not reactive in an isocyanate addition reaction, and
      (3) hydroxy-, amino-, or mercapto-containing organotin, organolead, organotitanium, or organobismuth groups, and
   (d) at least 10% by weight, based on 100% by weight of (a), of a water-miscible aprotic dipolar solvent, at a temperature of from 20 to 210° C., in a manner such that the reaction mixture remains substantially homogeneous during the hydrolysis.

2. The process of claim 1 in which (a) has an NCO-content of from 1.2 to 25% by weight.

3. The process of claim 1 in which (a) has an NCO-content of from 1.5 to 15% by weight.

4. The process of claim 1 in which (e) a noncatalyst containing a hydroxy and/or amino and/or thio group attached to an aliphatic, cycloaliphatic, heterocyclic, or aromatic radical is present during the hydrolysis.

5. The process of claim 1 in which the catalyst compound (c) is used as a combination with a basic alkali carboxylate, alkali carbonate, alkali hydrogen carbonate, alkali hydroxide, alkaline earth carboxylate, alkaline earth carbonate, alkaline earth hydrogen carbonate, or alkaline earth hydroxide. carbonate, or alkaline earth hydroxide.

6. The process of claim 1 in which the catalyst compound (c) is at least one member selected from the group of an alkali salt of a hydroxycarboxylic acid, an alkali salt of an aminocarboxylic acid, and an alkali alcoholate of a t-aminoalcohol.

7. The process of claim 6 in which the catalyst compound (c) is used in a quantity of from 0.0001 to 10% by weight, based on 100% by weight of (a).

8. The process of claim 1 in which the water (b) is used in a quantity of from 2 to 10 moles for every equivalent of NCO in (a).

9. The process of claim 1 in which the water-miscible aprotic dipolar solvent (d) is selected from solvents containing carboxylic acid dialkylamide, lactam, tetraalkyl urea, sulfone sulfoxide, or phosphorodialkylamide groups and having a boiling point of from 56 to 250° C.

10. The process of claim 9 in which the solvent (d) is used in a quantity of at least 50% by weight, based on 100% by weight of (a).

11. The process of claim 1 in which (a) is an NCO-prepolymer containing from 1.5 to 15% by weight aromatically bound NCO based on a relatively high molecular weight difunctional or trifunctional polyether, polyester, polycarbonate, or polycaprolactone polyol.

12. The process of claim 1 in which (a) contains a free carboxyl group, a carboxylate group, a t-amino group, or a combination thereof.

13. The process of claim 1 which is carried out on a continuous basis.

14. The process of claim 1 in which the hydrolysis product is treated with an acid.

* * * * *